(12) United States Patent
Okuda

(10) Patent No.: US 11,108,082 B2
(45) Date of Patent: Aug. 31, 2021

(54) COMPOSITE SOLID ELECTROLYTE LAYER, METHOD FOR PRODUCING THE SAME, AND METHOD FOR PRODUCING ALL-SOLID-STATE BATTERY

(71) Applicant: TOYOTA JIDOSHA KABUSHIKI KAISHA, Toyota (JP)

(72) Inventor: Koji Okuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/553,887

(22) Filed: Aug. 28, 2019

(65) Prior Publication Data

US 2020/0075995 A1 Mar. 5, 2020

(30) Foreign Application Priority Data

Sep. 3, 2018 (JP) .............................. JP2018-164860

(51) Int. Cl.
*H01M 10/0562* (2010.01)
*H01M 10/0525* (2010.01)
*H01M 10/058* (2010.01)

(52) U.S. Cl.
CPC ..... *H01M 10/0562* (2013.01); *H01M 10/058* (2013.01); *H01M 10/0525* (2013.01); *H01M 2300/0065* (2013.01); *H01M 2300/0091* (2013.01)

(58) Field of Classification Search
CPC ............................................... H01M 10/0562
See application file for complete search history.

(56) References Cited

U.S. PATENT DOCUMENTS

| 2013/0260257 A1* | 10/2013 | Choi | H01M 10/0525 429/303 |
| 2018/0277889 A1* | 9/2018 | Anandan | H01M 10/0562 |
| 2020/0266413 A1* | 8/2020 | Chae | H01M 4/382 |

FOREIGN PATENT DOCUMENTS

| JP | 2005-276847 A | | 10/2005 | |
| JP | 2012-094437 A | | 5/2012 | |
| JP | 2015-092433 A | | 5/2015 | |
| JP | 2018-101641 | * | 6/2018 | ........ H01M 10/0562 |

\* cited by examiner

*Primary Examiner* — Alix E Eggerding
(74) *Attorney, Agent, or Firm* — Sughrue Mion, PLLC

(57) ABSTRACT

To provide a composite solid electrolyte layer with a balance between electrical conductivity and deformability, a method for producing the composite solid electrolyte layer, and a method for producing an all-solid-state battery comprising the composite solid electrolyte layer. Disclosed is a method for producing a composite solid electrolyte layer for all-solid-state batteries, herein the method comprises: preparing a solid electrolyte, preparing a three-dimensional porous film containing a resin, forming a precursor of the composite solid electrolyte layer by bringing the solid electrolyte into contact with the three-dimensional porous film, and applying pressure to the precursor while heating the precursor at a temperature which is 80° C. or more and which is less than a softening temperature of the three-dimensional porous film; wherein a pore diameter of the three-dimensional porous film is more than 2 μm; and wherein the softening temperature of the three-dimensional porous film is lower than a crystallization temperature of the solid electrolyte.

9 Claims, 1 Drawing Sheet

COMPOSITE SOLID ELECTROLYTE LAYER, METHOD FOR PRODUCING THE SAME, AND METHOD FOR PRODUCING ALL-SOLID-STATE BATTERY

TECHNICAL FIELD

The disclosure relates to a composite solid electrolyte layer, a method for producing the same, and a method for producing an all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses an all-solid battery having a high withstand voltage and being less susceptible to short circuit, in which an insulating material having a higher withstand voltage than argon, is disposed in gaps between the particles of a solid electrolyte material.

Patent Literature 2 discloses a high polymer solid electrolyte comprising a stretched porous polytetrafluoroethylene and a polymer solid electrolyte resin contained in the pores of the polytetrafluoroethylene.

Patent Literature 3 discloses an electrode comprising a three-dimensional network porous body in which the pores are filled with at least an active material and a solid electrolyte.

Patent Literature 1: Japanese Patent Application Laid-Open (JP-A) No. 2012-094437
Patent Literature 2: JP-A No. 2005-276847
Patent Literature 3: JP-A No. 2015-92433

Stress is applied to the solid electrolyte layer of an all-solid-state battery, when confining pressure, vibration or the like is applied to the all-solid-state battery from the outside, or when the active material of the all-solid-state battery causes volume change during battery charge and discharge.

Since the solid electrolyte layer of the all-solid-state battery is formed by pressure-forming a solid, the porosity of the solid electrolyte layer is low. To ensure desired ion conductivity, the solid electrolyte layer is generally composed of a solid electrolyte and a small amount of binder.

Accordingly, when adhesion between the particles of the solid electrolyte in the solid electrolyte layer is not sufficient, the solid electrolyte layer cannot follow the stress and deform. As a result, the stress is concentrated in the solid electrolyte layer, and there is a problem that cracking occurs in the solid electrolyte layer and part of the solid electrolyte layer falls off, resulting in a decrease in battery properties.

SUMMARY

In light of the above circumstance, an object of the disclosed embodiments is to provide a composite solid electrolyte layer with a balance between electrical conductivity and deformability, a method for producing the composite solid electrolyte layer, and a method for producing an all-solid-state battery comprising the composite solid electrolyte layer.

In a first embodiment, there is provided a method for producing a composite solid electrolyte layer for all-solid-state batteries, wherein the method comprises:
preparing a solid electrolyte,
preparing a three-dimensional porous film containing a resin,
forming a precursor of the composite solid electrolyte layer by bringing the solid electrolyte into contact with the three-dimensional porous film, and
applying pressure to the precursor while heating the precursor at a temperature which is 80° C. or more and which is less than a softening temperature of the three-dimensional porous film;
wherein a pore diameter of the three-dimensional porous film is more than 2 µm; and
wherein the softening temperature of the three-dimensional porous film is lower than a crystallization temperature of the solid electrolyte.

The applying the pressure may be applying pressure to the precursor while heating the precursor at a temperature of from 80° C. to 160° C.

The porosity of the three-dimensional porous film may be from 60% to 90%.

The solid electrolyte may be solid electrolyte particles, and the average particle diameter of the solid electrolyte particles may be from 0.5 µm to 2 µm.

The resin may be polypropylene.

The forming the precursor may comprise:
preparing a slurry containing the solid electrolyte,
applying the slurry to at least one surface of the three-dimensional porous film, and
drying the applied slurry to form a solid electrolyte mixture layer on at least one surface of the three-dimensional porous film, thereby forming the precursor in which the solid electrolyte mixture layer is disposed on at least one surface of the three-dimensional porous film.

In another embodiment, there is provided a method for producing an all-solid-state battery comprising a cathode comprising a cathode layer, an anode comprising an anode layer, and a solid electrolyte layer disposed between the cathode layer and the anode layer, wherein the solid electrolyte layer is a composite solid electrolyte layer obtained by the above-described production method.

In another embodiment, there is provided a composite solid electrolyte layer for all-solid-state batteries, wherein the composite solid electrolyte layer comprises a solid electrolyte and a three-dimensional porous film containing a resin;
wherein a pore diameter of the three-dimensional porous film is more than 2 µm; and
wherein a softening temperature of the three-dimensional porous film is lower than a crystallization temperature of the solid electrolyte.

The porosity of the three-dimensional porous film may be from 60% to 90%.

According to the disclosed embodiments, a composite solid electrolyte layer with a balance between electrical conductivity and deformability, a method for producing the composite solid electrolyte layer, and a method for producing an all-solid-state battery comprising the composite solid electrolyte layer, can be provided.

BRIEF DESCRIPTION OF THE DRAWINGS

In the accompanying drawings.

DETAILED DESCRIPTION

1. Method for Producing a Composite Solid Electrolyte Layer

The method for producing a composite solid electrolyte layer for all-solid-state batteries according to the disclosed embodiments, is a method for producing a composite solid electrolyte layer for all-solid-state batteries, wherein the method comprises:

preparing a solid electrolyte, preparing a three-dimensional porous film containing a resin, forming a precursor of the composite solid electrolyte layer by bringing the solid electrolyte into contact with the three-dimensional porous film, and applying pressure to the precursor while heating the precursor at a temperature which is 80° C. or more and which is less than a softening temperature of the three-dimensional porous film;

wherein a pore diameter of the three-dimensional porous film is more than 2 μm; and wherein the softening temperature of the three-dimensional porous film is lower than a crystallization temperature of the solid electrolyte.

As a result of research, it was found that the composite solid electrolyte layer obtained by mixing the solid electrolyte and the three-dimensional porous film, which is a porous film containing the resin that can be softened at a lower temperature than the crystallization temperature of the solid electrolyte, and applying pressure to the resulting mixture while applying heat at the given temperature to the mixture, is a composite solid electrolyte layer with a balance between electrical conductivity and deformability.

Figure 1:
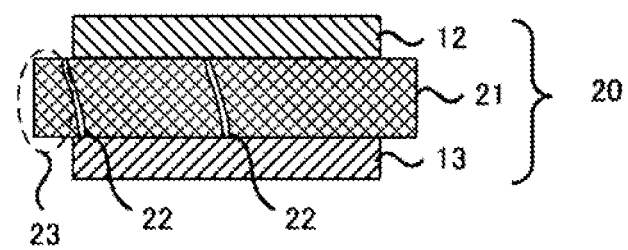
FIG. 1 is a view showing an example of the state in which stress is applied to a laminate of a cathode layer, a solid electrolyte layer and an anode layer in a conventional all-solid-state battery.

FIG. 1 is a view showing an example of the state in which stress is applied to a laminate of a cathode layer, a solid electrolyte layer and an anode layer in a conventional all-solid-state battery.

As shown in FIG. 1, when stress is applied to a laminate 20, the applied stress is concentrated in a solid electrolyte layer 21. Accordingly, cracking 22 occurs in the solid electrolyte layer 21, and due to the cracking 22, an end 23 of the solid electrolyte layer 21 falls off.

Figure 2:
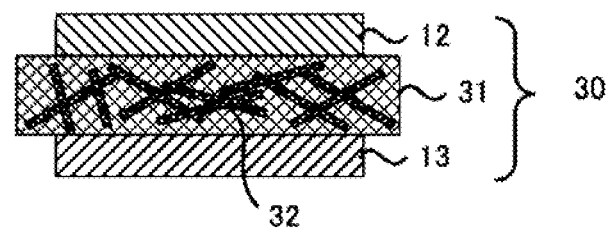
FIG. 2 is a view showing an example of the state in which stress is applied to a laminate of a cathode layer, a composite solid electrolyte layer and an anode layer in an all-solid-state battery obtained by the production method of the disclosed embodiments.

FIG. 2 is a view showing an example of the state in which stress is applied to a laminate of a cathode layer, a composite solid electrolyte layer and an anode layer in an all-solid-state battery obtained by the production method of the disclosed embodiments.

As shown in FIG. 2, when stress is applied to a laminate 30, due to the presence of a three-dimensional porous film 32 contained in a composite solid electrolyte layer 31, adhesion between the particles of the solid electrolyte is increased. Accordingly, cracking in the composite solid electrolyte layer and falling off of an end of the composite solid electrolyte layer 31, can be suppressed.

The method for producing the composite solid electrolyte layer according to the disclosed embodiments, comprises at least the steps of (1) preparing a solid electrolyte, (2) preparing a three-dimensional porous film, (3) forming a precursor and (4) applying pressure.

Hereinafter, they will be described in order.

(1) Preparing a Solid Electrolyte

As the solid electrolyte, examples include, but are not limited to, an oxide-based solid electrolyte and a sulfide-based solid electrolyte.

As the sulfide-based solid electrolyte, examples include, but are not limited to, $Li_2S$—$P_2S_5$, $Li_2S$—$SiS_2$, $LiX$—$Li_2S$—$SiS_2$, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds.

The sulfide-based solid electrolytes may be a glass, a crystal material or a glass ceramic. The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented. The glass ceramic can be obtained by heating a glass. The crystal material can be obtained by developing a solid state reaction of the raw material composition, for example.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

The form of the solid electrolyte may be a particulate form.

The average particle diameter ($D_{50}$) of the solid electrolyte particles is not particularly limited. From the point of view that the pores of the three-dimensional porous film can be easily filled with the solid electrolyte particles, the average particle diameter ($D_{50}$) of the solid electrolyte particles may be smaller than the pore diameter of the three-dimensional porous film. More specifically, the lower limit of the average particle diameter ($D_{50}$) of the solid electrolyte particles may be 0.5 μm or more. On the other hand, the upper limit may be 2 μm or less.

As the solid electrolyte, one or more kinds of solid electrolytes may be used.

For the crystallization temperature of the solid electrolyte, the lower limit may be 190° C. or more, and the upper limit may be 270° C. or less.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when the particle diameters of particles are arranged in ascending order, the accumulated volume of the particles is half (50%) the total volume of the particles.

(2) Preparing a Three-Dimensional Porous Film

The three-dimensional porous film contains a resin. The three-dimensional porous film may be composed of the resin.

The softening temperature of the three-dimensional porous film is not particularly limited, as long as it is lower than the crystallization temperature of the solid electrolyte. The softening temperature of the three-dimensional porous film may be 100° C. or more and 170° C. or less.

The softening temperature can be measured by use of a thermogravimetry/differential thermal analyzer (TG-DTA), a calorimeter, etc.

As the resin, examples include, but are not limited to, polyethylene (PE), polypropylene (PP) and polyethylene terephthalate (PET). The resin may be polypropylene (PP).

For the pore diameter of the three-dimensional porous film, the lower limit may be more than 2 μm, and the upper limit may be 30 μm or less.

For the porosity of the three-dimensional porous film, the lower limit may be 50% or more, or it may be 60% or more, from the point of view that the solid electrolyte particles can easily enter the pores of the three-dimensional porous film. On the other hand, the upper limit may be 95% or less, may be 90% or less, or may be 80% or less, from the viewpoint of retaining the film form of the three-dimensional porous film. When the porosity of the three-dimensional porous film is more than 95%, it is difficult to form the three-dimensional porous film.

(3) Forming a Precursor

This is a step of forming a precursor of the composite solid electrolyte layer by bringing the solid electrolyte into contact with the three-dimensional porous film.

The method for bringing the solid electrolyte into contact with the three-dimensional porous film, is not particularly limited. For example, the three-dimensional porous film may be mixed with the solid electrolyte, or the pores of the three-dimensional porous film may be filled with the solid electrolyte.

From the viewpoint of uniformly dispersing the solid electrolyte and efficiently bringing the solid electrolyte into contact with the three-dimensional porous film, the step of forming the precursor may include the steps of (3-1) preparing a slurry, (3-2) applying the slurry and (3-3) drying the applied slurry.

(3-1) Preparing a Slurry

The slurry contains at least a solid electrolyte and a solvent. As needed, it contains a binder.

As the solvent, examples include, but are not limited to, butyl acetate, heptane and N-methyl-2-pyrrolidone.

As the binder, examples include, but are not limited to, a binder that can be incorporated in the below-described cathode.

(3-2) Applying the Slurry

This is a step of applying the slurry to at least one surface of the three-dimensional porous film.

The method for applying the slurry to at least one surface of the three-dimensional porous film, is not particularly limited. As the method, examples include, but are not limited to, a doctor blade method, a metal mask printing method, an electrostatic coating method, a dip coating method, a spray coating method, a roller coating method, a gravure coating method and a screen printing method.

(3-3) Drying the Applied Slurry

This is a step of drying the applied slurry to form a solid electrolyte mixture layer on at least one surface of the three-dimensional porous film, thereby forming the precursor in which the solid electrolyte mixture layer is disposed on at least one surface of the three-dimensional porous film.

The solid electrolyte mixture layer may be formed on at least one surface of the three-dimensional porous film. From the viewpoint of obtaining the composite solid electrolyte layer with a better balance between electrical conductivity and deformability, the solid electrolyte mixture layer may be formed on both surfaces of the three-dimensional porous film.

The precursor of the composite solid electrolyte layer obtained in the step of drying the slurry, may be a laminate of the three-dimensional porous film and the solid electrolyte mixture layer.

(4) Applying Pressure

This is a step of applying pressure to the precursor while heating the precursor at a temperature which is 80° C. or more and which is less than the softening temperature of the three-dimensional porous film.

The pressure applied to the precursor is not particularly limited. The lower limit of the pressure may be more than the atmospheric pressure, or it may be 1 ton/cm$^2$ (≈98 MPa) or more. On the other hand, the upper limit may be 600 MPa or less, or it may be 5 ton/cm$^2$ (≈490 MPa) or less.

The method for applying the pressure is not particularly limited. For example, a plate press machine or a roll press machine may be used.

In this step, the precursor heating temperature may be a temperature which is 80° C. or more and which is less than the softening temperature of the three-dimensional porous film.

When the resin contained in the three-dimensional porous film is polypropylene with a softening temperature of 170° C., the lower limit of the precursor heating temperature may be 100° C. or more, or it may be 120° C. or more. On the other hand, the upper limit may be 160° C. or less, or it may be 140° C. or less.

2. Composite Solid Electrolyte Layer

The composite solid electrolyte layer according to the disclosed embodiments, is a composite solid electrolyte layer for all-solid-state batteries, wherein the composite solid electrolyte layer comprises a solid electrolyte and a three-dimensional porous film containing a resin;

wherein a pore diameter of the three-dimensional porous film is more than 2 μm; and wherein a softening temperature of the three-dimensional porous film is lower than a crystallization temperature of the solid electrolyte.

The composite solid electrolyte layer contains at least the solid electrolyte and the three-dimensional porous film.

As the solid electrolyte contained in the composite solid electrolyte layer, examples include, but are not limited to, a solid electrolyte that is usable in the above-described production method.

As the composite solid electrolyte layer contained in the three-dimensional porous film, examples include, but are not limited to, a three-dimensional porous film that is usable in the above-described production method.

As the solid electrolyte, one or more kinds of solid electrolytes may be used. In the case of using two or more kinds of solid electrolytes, they may be mixed together, or they may be formed into layers to obtain a multi-layered structure.

The percentage of the solid electrolyte in the composite solid electrolyte layer is not particularly limited. For example, the lower limit may be 50 mass % or more, may be 60 mass % or more, or may be 70 mass % or more. On the other hand, the upper limit may be 90 mass % or less, may be 85 mass % or less, or may be 80 mass % or less, for example.

The percentage of the three-dimensional porous film in the composite solid electrolyte layer is not particularly limited. For example, the lower limit may be 10 mass % or more, may be 15 mass % or more, or may be 20 mass % or more. On the other hand, the upper limit may be 50 mass % or less, may be 40 mass % or less, or may be 30 mass % or less, for example.

From the viewpoint of exerting plasticity, etc., a binder for binding the solid electrolyte particles can be incorporated in the composite solid electrolyte layer. As the binder, examples include, but are not limited to, a binder that can be incorporated in the below-described cathode. However, the content of the binder in the composite solid electrolyte layer may be 5 mass % or less, from the viewpoint of preventing excessive aggregation of the solid electrolyte, enabling the formation of the composite solid electrolyte layer in which the solid electrolyte is uniformly dispersed, etc., for the purpose of easily achieving high power output.

The thickness of the composite solid electrolyte layer is not particularly limited. It is generally 0.1 μm or more and 1 mm or less.

For the electrical conductivity of the composite solid electrolyte layer, the lower limit may be 0.8 mS/cm or more, or it may be 1.8 mS/cm or more. On the other hand, the upper limit is not particularly limited. The upper limit may be 4.2 mS/cm or less, or it may be 2.7 mS/cm or less.

For the deformation amount of the composite solid electrolyte layer, the lower limit may be more than 4.0%, or it may be 7.2% or more. On the other hand, the upper limit is not particularly limited. The upper limit may be 9.2% or less, or it may be 8.6% or less.

3. Method for Producing an all-Solid-State Battery

The method for producing an all-solid-state battery according to the disclosed embodiment, is a method for producing an all-solid-state battery comprising a cathode comprising a cathode layer, an anode comprising an anode layer, and a solid electrolyte layer disposed between the cathode layer and the anode layer, wherein the solid electrolyte layer is a composite solid electrolyte layer obtained by the above-described production method.

The method for producing the all-solid-state battery of the disclosed embodiments, is as follows, for example. First, the composite solid electrolyte layer is formed by the above-described method for producing the composite solid electrolyte layer. Next, the cathode layer is obtained by pressure-forming a powdered cathode mix on one surface of the composite solid electrolyte layer. Then, the anode layer is obtained by pressure-forming a powdered anode mix on the other surface of the composite solid electrolyte layer. Then, a cathode layer-composite solid electrolyte layer-anode layer assembly thus obtained, is used as the all-solid-state battery.

In this case, the press pressure applied for pressure-forming the powdered cathode mix and the powdered anode mix, is generally about 1 MPa or more and about 600 MPa or less.

The pressure applying method is not particularly limited. As the method, examples include, but are not limited to, applying pressure by use of a plate press machine, a roll press machine, etc.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

Figure 3:
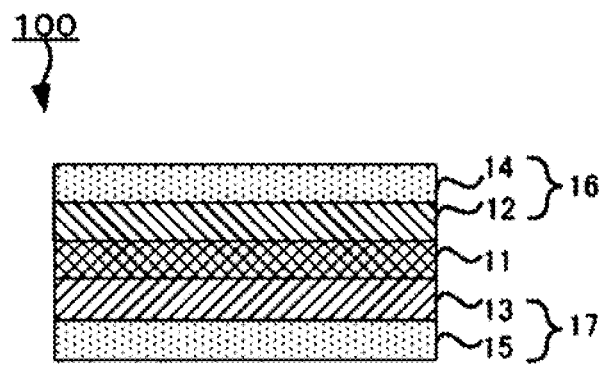
FIG. 3 is a schematic sectional view of an example of the all-solid-state battery obtained by the production method of the disclosed embodiments.

FIG. 3 is a schematic sectional view of an example of the all-solid-state battery obtained by the production method of the disclosed embodiments.

As shown in FIG. 3, an all-solid-state battery 100 comprises a cathode 16 comprising a cathode layer 12 and a cathode current collector 14, an anode 17 comprising an anode layer 13 and an anode current collector 15, and a composite solid electrolyte layer 11 disposed between the cathode 16 and the anode 17.

[Cathode]

The cathode comprises at least the cathode layer and the cathode current collector.

The cathode layer contains a cathode active material. As optional components, the cathode layer may contain a solid electrolyte, an electroconductive material and a binder.

The type of the cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. For the thickness of the coating layer, the lower limit may be 0.1 nm or more, or it may be 1 nm or more, for example. On the other hand, the upper limit may be 100 nm or less, or it may be 20 nm or less, for example. The coverage of the coating layer on the cathode active material surface may be 70% or more, or it may be 90% or more, for example.

As the solid electrolyte contained in the cathode layer, examples include, but are not limited to, the same solid electrolytes as the solid electrolytes that may be used in the above-described method for producing the composite solid electrolyte layer.

The content of the solid electrolyte in the cathode layer is not particularly limited.

As the electroconductive material, examples include, but are not limited to, a carbonaceous material and a metal material. As the carbonaceous material, examples include, but are not limited to, carbon blacks such as acetylene black (AB) and Ketjen Black (KB), and fibrous carbonaceous materials such as vapor-grown carbon fiber (VGCF), carbon nanotube (CNT) and carbon nanofiber (CNF).

The content of the electroconductive material in the cathode layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited.

The method for forming the cathode layer is not particularly limited. As the method, examples include, but are not limited to, pressure-forming a powdered cathode mix that contains the cathode active material and, as needed, other components.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer is the composite solid electrolyte layer obtained by the above-described method for producing the composite solid electrolyte layer.

The composite solid electrolyte layer will not be described here, since the composite solid electrolyte layer is as described above in "2. Composite solid electrolyte layer".

[Anode]

The anode comprises an anode layer and an anode current collector.

The anode layer contains an anode active material.

As the anode active material, a conventionally-known material may be used. As the anode active material, examples include, but are not limited to, a lithium metal (Li), a lithium alloy, carbon, Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, an alloy with a metal such as Li, and an alloy with at least one metal selected from the group consisting of Sn, Ge and Al.

By assembling the all-solid-state battery and initially charging the battery, the Si is reacted with a metal such as Li to form an amorphous alloy. An alloyed part of the Si is kept amorphized even after metal ions such as lithium ions are released by discharging the battery. In the disclosed embodiments, therefore, the anode layer comprising Si include such an embodiment that the Si is formed into amorphous alloy.

The form of the anode active material is not particularly limited. For example, it may be a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

The method for forming the anode layer is not particularly limited. As the method, examples include, but are not limited to, pressure-forming a powdered anode mix that contains the anode active material and, as needed, other components.

As the anode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, a lithium battery in which a lithium metal deposition-dissolution reaction is used as an anode reaction, a lithium ion battery which is charged and discharged by lithium ion transfer between the cathode and the anode, a sodium battery, a magnesium battery and a calcium battery. The all-solid-state battery may be a lithium ion battery. Also, the all-solid-state battery may be a primary or secondary battery.

As the form of the all-solid-state battery, examples include, but are not limited to, a coin form, a laminate form, a cylindrical form and a square form.

EXAMPLES

Example 1

[Preparing a Solid Electrolyte]

LiI—$Li_2O$—$Li_2S$—$P_2S_5$ particles were prepared as a sulfide-based solid electrolyte. The average particle diameter ($D_{50}$) of the sulfide-based solid electrolyte was 2 μm. The crystallization temperature of the sulfide-based solid electrolyte was about 190° C.

[Preparing a Three-Dimensional Porous Film]

A three-dimensional porous film was prepared, which was made of polypropylene and which had a pore diameter of 30 μm and a porosity of 80%. The softening temperature of the polypropylene was 170° C.

[Preparing a Slurry]

PVdF (manufactured by Kureha Corporation) was prepared as a binder. Then, a butyl butyrate solution was prepared, in which the binder was contained at a concentration of 5 mass %.

Then, the butyl butyrate solution containing the binder at a concentration of 5 mass %, was added to the sulfide-based solid electrolyte to ensure that the binder was 1 parts by mass with respect to 100 parts by mass of the sulfide-based solid electrolyte, thereby obtaining a mixture. Butyl butyrate was added to the mixture to ensure that the solid content of the mixture was 50 mass %. Then, the mixture was kneaded for one minute by use of an ultrasonic homogenizer, thereby obtaining a slurry.

[Applying the Slurry]

The thus-produced slurry was applied to both surfaces of the three-dimensional porous film, at the same time.

[Drying the Applied Slurry]

Then, the applied slurry was naturally dried for 10 minutes. Next, the dried slurry was dried in vacuum for 30 minutes.

[Forming a Precursor]

By drying the slurry in vacuum, solid electrolyte mixture layers were formed on both surfaces of the three-dimensional porous film. Accordingly, a precursor in which the solid electrolyte mixture layers were disposed on both surfaces of the three-dimensional porous film, was produced. From the amount of the applied slurry, it was found that the mass ratio of the three-dimensional porous film to the solid electrolyte in the precursor was 30:70.

[Applying Pressure to the Precursor]

A pressure of 5 ton/cm$^2$ ($\approx$490 MPa) was applied to the precursor, while heating the precursor at 80° C., thereby obtaining a composite solid electrolyte layer.

Example 2

The composite solid electrolyte layer of Example 2 was obtained in the same manner as Example 1, except that in the "Applying pressure to the precursor", the precursor heating temperature was changed to 100° C.

Example 3

The composite solid electrolyte layer of Example 3 was obtained in the same manner as Example 1, except that in the "Applying pressure to the precursor", the precursor heating temperature was changed to 120° C.

Example 4

The composite solid electrolyte layer of Example 4 was obtained in the same manner as Example 1, except that in the "Applying pressure to the precursor", the precursor heating temperature was changed to 140° C.

Example 5

The composite solid electrolyte layer of Example 5 was obtained in the same manner as Example 1, except that in the "Applying pressure to the precursor", the precursor heating temperature was changed to 160° C.

Comparative Example 1

The composite solid electrolyte layer of Comparative Example 1 was obtained in the same manner as Example 1, except that in the "Applying pressure to the precursor", the precursor heating temperature was changed to 25° C.

Comparative Example 2

A precursor was produced in the same manner as Example 1. Then, pressure was applied to the precursor in the same manner as the "Applying pressure to the precursor" of Example 1, except that the precursor heating temperature was changed to 170° C. That is, in Comparative Example 2, the precursor was heated at the same temperature as the softening temperature of propylene. However, the three-dimensional porous film in the precursor deformed too much, thereby failing to form a composite solid electrolyte layer.

Comparative Example 3

A precursor was produced in the same manner as Example 1. Then, pressure was applied to the precursor in the same manner as the "Applying pressure to the precursor" of Example 1, except that the precursor heating temperature was changed to 180° C. However, the three-dimensional porous film in the precursor deformed too much, thereby failing to form a composite solid electrolyte layer.

Comparative Example 4

A precursor was produced in the same manner as Example 1. Then, pressure was applied to the precursor in the same manner as the "Applying pressure to the precursor" of Example 1, except that the precursor heating temperature was changed to 200° C. However, the three-dimensional porous film in the precursor deformed too much, thereby failing to form a composite solid electrolyte layer.

Comparative Example 5

A precursor was produced in the same manner as Example 1. Then, pressure was applied to the precursor in the same manner as the "Applying pressure to the precursor" of Example 1, except that the precursor heating temperature was changed to 220° C. However, the three-dimensional porous film in the precursor deformed too much, thereby failing to form a composite solid electrolyte layer.

Example 6

The composite solid electrolyte layer of Example 6 was obtained in the same manner as Example 1, except the following points: (1) in the "Preparing a three-dimensional porous film", a three-dimensional porous film was prepared, which was made of polypropylene and which had a pore diameter of 20 μm and a porosity of 80%, and (2) in the "Applying pressure to the precursor", the precursor heating temperature was changed to 120° C.

Example 7

The composite solid electrolyte layer of Example 7 was obtained in the same manner as Example 1, except the following points: (1) in the "Preparing a three-dimensional porous film", a three-dimensional porous film was prepared, which was made of polypropylene and which had a pore diameter of 10 μm and a porosity of 80%, and (2) in the "Applying pressure to the precursor", the precursor heating temperature was changed to 120° C.

Comparative Example 6

A three-dimensional porous film was prepared in the same manner as Example 1, which was made of polypropylene and which had a pore diameter of 2 μm and a porosity of 80%. A slurry was prepared in the same manner as the "Preparing a slurry" of Example 1. Then, in the "Applying the slurry", the slurry was tried to be applied to both surfaces of the three-dimensional porous film at the same time. However, the slurry caused solid-liquid separation on both surfaces of the three-dimensional porous film, and it was difficult to apply the slurry to both surfaces of the three-dimensional porous film. Accordingly, the subsequent steps were not carried out.

Example 8

The composite solid electrolyte layer of Example 8 was obtained in the same manner as Example 1, except the following points: (1) in the "Preparing a three-dimensional porous film", a three-dimensional porous film was prepared, which was made of polypropylene and which had a pore diameter of 30 μm and a porosity of 60%, and (2) in the "Applying pressure to the precursor", the precursor heating temperature was changed to 120° C.

Example 9

The composite solid electrolyte layer of Example 9 was obtained in the same manner as Example 1, except the following points: (1) in the "Preparing a three-dimensional porous film", a three-dimensional porous film was prepared, which was made of polypropylene and which had a pore diameter of 30 μm and a porosity of 50%, and (2) in the "Applying pressure to the precursor", the precursor heating temperature was changed to 120° C.

Comparative Example 7

The composite solid electrolyte layer of Comparative Example 7 was obtained in the same manner as Example 1, except the following points: (1) in the "Preparing a three-dimensional porous film", a three-dimensional porous film was prepared, which was made of glass fiber and which had a pore diameter of 30 μm and a porosity of 80%, and (2) in the "Applying pressure to the precursor", the precursor heating temperature was changed to 25° C.

The softening temperature of the glass fiber was 730° C. Accordingly, the softening temperature of the glass fiber was higher than the crystallization temperature (about 190° C.) of the solid electrolyte.

Comparative Example 8

The composite solid electrolyte layer of Comparative Example 8 was obtained in the same manner as Example 1, except the following points: (1) in the "Preparing a three-dimensional porous film", a three-dimensional porous film was prepared, which was made of glass fiber and which had a pore diameter of 30 μm and a porosity of 80%, and (2) in the "Applying pressure to the precursor", the precursor heating temperature was changed to 170° C.

Comparative Example 9

[Preparing a Solid Electrolyte]
A sulfide-based solid electrolyte was prepared in the same manner as Example 1.
[Preparing a Three-Dimensional Porous Film]
A three-dimensional porous film was not prepared. In place of the three-dimensional porous film, an Al foil was prepared as a substrate.
[Preparing a Slurry]
A slurry was prepared in the same manner as Example 1.
[Applying the Slurry]
The slurry was applied to one surface of the Al foil, by use of an applicator.
[Drying the Applied Slurry]
Then, the applied slurry was naturally dried for 5 minutes. Next, the naturally-dried slurry was dried by heating at 100° C. for 5 minutes.
[Forming a Solid Electrolyte Mixture Layer]
By drying the slurry, a solid electrolyte mixture layer was formed on one surface of the Al foil.
[Applying Pressure to the Solid Electrolyte Mixture Layer]
A pressure of 5 ton/cm² (≈490 MPa) was applied to the solid electrolyte mixture layer, while heating the solid electrolyte mixture layer at 170° C., thereby obtaining the solid electrolyte layer of Comparative Example 9.

Comparative Example 10

The solid electrolyte layer of Comparative Example 10 was obtained in the same manner as Comparative Example 9, except that in the "Applying pressure to the solid electrolyte mixture layer", the solid electrolyte mixture layer heating temperature was changed to 25° C.

Comparative Example 11

The solid electrolyte layer of Comparative Example 11 was obtained in the same manner as Comparative Example 9, except that in the "Applying pressure to the solid electrolyte mixture layer", the solid electrolyte mixture layer heating temperature was changed to 220° C.

[Electrical Conductivity Measurement]
The composite solid electrolyte layer of Example 1 was pulverized in a temperature condition of 25° C. to produce a powder.

The powder was put in a cylindrical tube with a fixed area to ensure that the solid electrolyte layer was computationally 30 μm. Then, the powder in the tube was sandwiched by SUS pins placed on the top and bottom of the tube, and a pressure of 5 ton/cm² (≈490 MPa) was applied to the powder by the pins, thereby producing an evaluation cell (hereinafter, it will be referred to as the evaluation cell of Example 1). The evaluation cells of Examples 2 to 9 and Comparative Examples 1 and 7 to 11 were produced in the same manner as Example 1, by use of the composite solid electrolyte layers of Examples 2 to 9, the composite solid electrolyte layers of Comparative Examples 1, 7 and 8, and the solid electrolyte layers of Comparative Examples 9 to 11, respectively. The thickness of each solid electrolyte layer was measured from an amount of change from point 0, which was defined before the pressure was applied, to a point observed after the pressure was applied.

Impedance measurement of the evaluation cell of Example 1 was carried out at a frequency of from 10 Hz to 1000000 Hz, thereby obtaining the resistance value of the composite solid electrolyte layer of Example 1. From the resistance value, the electrical conductivity (mS/cm) of the composite solid electrolyte layer of Example 1 was calculated. The result is shown in Table 1. In the same manner as Example 1, the electrical conductivities (mS/cm) of the composite solid electrolyte layers of Example 2 to 9, those of the composite solid electrolyte layers of Comparative Examples 1, 7 and 8, and those of the solid electrolyte layers of Comparative Examples 9 to 11, were calculated. The results are shown in Table 1.

[Deformation Amount Measurement]
The solid electrolyte layer of Comparative Example 9 was transferred from the Al foil onto a Cu foil. Then, the transferred solid electrolyte layer was pressed at a given pressure in a given temperature condition.

Then, the solid electrolyte layer was removed from the Cu foil and processed into a dumbbell form.

Then, by use of a tensile tester, stress was applied to the processed solid electrolyte layer to stretch the solid electrolyte layer, until cracking occurred in the solid electrolyte layer.

Then, the length of the solid electrolyte layer before the stress was applied thereto, was determined as a reference length L. Then, the length of the stretched solid electrolyte layer was measured and determined as a length λ.

For the solid electrolyte layer of Comparative Example 9, the deformation amount (%) with respect to the reference length L, was calculated by the following formula (1). The result is shown in Table 1.

$$\text{Deformation amount (\%)} = \{(\lambda-L)/L\} \times 100 \quad \text{Formula (1)}$$

Also, the deformation amounts of the solid electrolyte layers of Comparative Examples 10 and 11 were obtained in the same manner as Comparative Example 9. The results are shown in Table 1.

The composite solid electrolyte layer of Example 1 was processed into a dumbbell form.

Then, by use of the tensile tester, stress was applied to the processed composite solid electrolyte layer to stretch the composite solid electrolyte layer, until cracking occurred in the composite solid electrolyte layer.

Then, the length of the composite solid electrolyte layer before the stress was applied thereto, was determined as a reference length L. Then, the length of the stretched composite solid electrolyte layer was measured and determined as a length $\lambda$.

For the composite solid electrolyte layer of Example 1, the deformation amount (%) with respect to the reference length L, was calculated by the formula (1). The result is shown in Table 1. Also, the deformation amounts (%) of the composite solid electrolyte layers of Examples 2 to 9 and those of the composite solid electrolyte layers of Comparative Examples 1, 7 and 8, were obtained in the same manner as Example 1. The results are shown in Table 1. In Table 1, "PP" means polypropylene, and "GF" means glass fiber.

Example 11, in which the solid electrolyte was heated at a higher temperature than the crystallization temperature (about 190° C.) of the solid electrolyte, are low compared to the solid electrolyte layers of Comparative Examples 9 and 10, in each of which the solid electrolyte was heated at a temperature equal to or higher than the crystallization temperature of the solid electrolyte.

Accordingly, it is clear that from the viewpoint of better balance between electrical conductivity and deformation amount, the precursor of the composite solid electrolyte layer may be heated at a temperature equal to or lower than the crystallization temperature of the solid electrolyte.

From the results of Comparative Examples 1 and 10, it is clear that the electrical conductivity of Comparative Example 1, in which the composite solid electrolyte layer was formed by applying pressure at a temperature of 25° C., is extremely low compared to the solid electrolyte layer of Comparative Example 10, in which polypropylene was not contained.

Accordingly, it is clear that integrating the three-dimensional porous film and the solid electrolyte is not enough to ensure the electrical conductivity of the composite solid electrolyte layer.

From the results of Examples 1 to 5 and Comparative Examples 1 to 5, it is clear that the electrical conductivity and deformation amount of the thus-obtained composite solid electrolyte layer are increased by increasing, when

TABLE 1

| | Three-dimensional porous film | | | Temperature | | |
| | Material | Pore diameter (μm) | Porosity (%) | Softening temperature (° C.) | (° C.) when applying pressure | Electrical conductivity (mS/cm) | Deformation amount (%) |
|---|---|---|---|---|---|---|---|
| Comparative Example 1 | PP | 30 | 80 | 170 | 25 | 0.1 | 7.8 |
| Example 1 | PP | 30 | 80 | 170 | 80 | 2.1 | 7.7 |
| Example 2 | PP | 30 | 80 | 170 | 100 | 2.4 | 8.1 |
| Example 3 | PP | 30 | 80 | 170 | 120 | 2.7 | 8.0 |
| Example 4 | PP | 30 | 80 | 170 | 140 | 2.5 | 8.2 |
| Example 5 | PP | 30 | 80 | 170 | 160 | 2.0 | 7.2 |
| Comparative Example 2 | PP | 30 | 80 | 170 | 170 | — | — |
| Comparative Example 3 | PP | 30 | 80 | 170 | 180 | — | — |
| Comparative Example 4 | PP | 30 | 80 | 170 | 200 | — | — |
| Comparative Example 5 | PP | 30 | 80 | 170 | 220 | — | — |
| Example 6 | PP | 20 | 80 | 170 | 120 | 2.5 | 8.0 |
| Example 7 | PP | 10 | 80 | 170 | 120 | 2.1 | 8.0 |
| Comparative Example 6 | PP | 2 | 80 | 170 | — | — | — |
| Example 8 | PP | 30 | 60 | 170 | 120 | 1.8 | 8.6 |
| Example 9 | PP | 30 | 50 | 170 | 120 | 0.8 | 9.2 |
| Comparative Example 7 | GF | 30 | 80 | 730 | 25 | 0.1 | 4.0 |
| Comparative Example 8 | GF | 30 | 80 | 730 | 170 | 0.1 | 4.0 |
| Comparative Example 9 | — | — | — | — | 170 | 4.2 | 3.5 |
| Comparative Example 10 | — | — | — | — | 25 | 4.1 | 4.0 |
| Comparative Example 11 | — | — | — | — | 220 | 3.2 | 3.2 |

From the results of Comparative Examples 9 to 11, it is clear that the electrical conductivity and deformation amount of the solid electrolyte layer of Comparative applying pressure to the precursor and forming the composite solid electrolyte layer, the temperature to a temperature lower than the softening temperature of the polypropylene.

This is thought to be because, by deforming the polypropylene by heating, adhesion between the particles of the solid electrolyte is facilitated, and the form of the three-dimensional porous film is retained.

It was also revealed that by increasing, when applying pressure to the precursor and forming the composite solid electrolyte layer, the temperature to a temperature equal to or higher than the softening temperature of the polypropylene, the polypropylene is deformed too much, and it is difficult to form the composite solid electrolyte layer.

From the results of Comparative Examples 7 to 10, it is clear that the composite solid electrolyte layers of Comparative Examples 7 and 8, in each of which the glass fiber was used as the three-dimensional porous film, had extremely low electrical conductivity and no increase in deformability, compared to the solid electrolyte layers of Comparative Examples 9 and 10, in each of which the three-dimensional porous film was not used.

The softening temperature of the glass fiber is 730° C., which is higher than the crystallization temperature (190° C.) of the solid electrolyte. Accordingly, it is clear that the thus-obtained composite solid electrolyte layer cannot be a composite solid electrolyte layer with a balance between electrical conductivity and deformability, as long as the three-dimensional porous film that can be softened at a lower temperature than the crystallization temperature of the solid electrolyte, is not used.

From the result of Comparative Example 6, it was revealed that in the case of using the three-dimensional porous film with a pore diameter of 2 μm or less, it is difficult to apply the slurry to at least one surface of the three-dimensional porous film, since the slurry causes solid-liquid separation on the at least one surface of the three-dimensional porous film. Accordingly, from the results of Comparative Example 6 and Examples 3, 6 and 7, it was revealed that the pore diameter of the three-dimensional porous film needs to be at least more than 2 μm.

Meanwhile, from the result of Example 7, it was proved that the composite solid electrolyte layer obtained by use of the three-dimensional porous film with a pore diameter of 10 μm or more, is a composite solid electrolyte layer with a balance between electrical conductivity and deformability.

From the results of Examples 3, 8 and 9, it is presumed that a large decrease in electrical conductivity is obtained when the porosity of the three-dimensional porous film is less than 50%. Accordingly, it is clear that to keep the electrical conductivity of the composite solid electrolyte layer at a desired level, the porosity may be 50% or more, or it may be 60% or more.

The deformation amount of each of the composite solid electrolyte layers of Examples 1 to 9, is from 7.2% to 9.2%. The deformation amount of each of the solid electrolyte layers of Comparative Examples 9 to 11, is from 3.2% to 4.0%. Accordingly, the deformation amount of each of the composite solid electrolyte layers of Examples 1 to 9, is 1.8 to 2.9 times higher compared to the solid electrolyte layers of Comparative Examples 9 to 11.

Accordingly, since the deformation amount of the composite solid electrolyte layer of the disclosed embodiments is large compared to conventional solid electrolyte layers, the range of options of active materials that are susceptible to volume change during battery charging and discharging, can be enlarged.

The electrical conductivity of each of the composite solid electrolyte layers of Examples 1 to 9, is from 0.8 mS/cm to 2.7 mS/cm. The electrical conductivity of each of the solid electrolyte layers of Comparative Examples 9 to 11, is from 3.2 mS/cm to 4.2 mS/cm. Accordingly, compared to the solid electrolyte layers of Comparative Examples 9 to 11, the electrical conductivities of the composite solid electrolyte layer of Examples 1 to 9 are low.

However, in general, compared to an electrode, the resistance value of the solid electrolyte layer is low. Accordingly, as long as the electrical conductivity is from 0.8 mS/cm to 2.7 mS/cm, which is the range of the electrical conductivities shown by the composite solid electrolyte layers of Examples 1 to 9, an increase in the resistance value of a whole battery comprising the composite solid electrolyte layer of the disclosed embodiments, is presumed to be small compared to conventional batteries.

Accordingly, the composite solid electrolyte layer of the disclosed embodiments is a composite solid electrolyte layer with a balance between electrical conductivity and deformability.

REFERENCE SIGNS LIST

11. Composite solid electrolyte layer
12. Cathode layer
13. Anode layer
14. Cathode current collector
15. Anode current collector
16. Cathode
17. Anode
20. Laminate
21. Solid electrolyte layer
22. Cracking
23. End
30. Laminate
31. Composite solid electrolyte layer
32. Three-dimensional porous film
100. All-solid-state battery

The invention claimed is:

1. A method for producing a composite solid electrolyte layer for all-solid-state batteries,
   wherein the method comprises:
   preparing a solid electrolyte,
   preparing a three-dimensional porous film containing a resin,
   forming a precursor of the composite solid electrolyte layer by bringing the solid electrolyte into contact with the three-dimensional porous film, and
   applying pressure to the precursor while heating the precursor at a temperature which is 80° C. or more and which is less than a softening temperature of the three-dimensional porous film;
   wherein a pore diameter of the three-dimensional porous film is more than 2 μm; and
   wherein the softening temperature of the three-dimensional porous film is lower than a crystallization temperature of the solid electrolyte.

2. The method for producing the composite solid electrolyte layer according to claim 1, wherein the applying the pressure is applying pressure to the precursor while heating the precursor at a temperature of from 80° C. to 160° C.

3. The method for producing the composite solid electrolyte layer according to claim 1, wherein a porosity of the three-dimensional porous film is from 60% to 90%.

4. The method for producing the composite solid electrolyte layer according to claim 1, wherein the solid electrolyte is solid electrolyte particles, and an average particle diameter of the solid electrolyte particles is from 0.5 μm to 2 μm.

5. The method for producing the composite solid electrolyte layer according to claim 1, wherein the resin is polypropylene.

6. The method for producing the composite solid electrolyte layer according to claim 1, wherein the forming the precursor comprises:
   preparing a slurry containing the solid electrolyte,
   applying the slurry to at least one surface of the three-dimensional porous film, and
   drying the applied slurry to form a solid electrolyte mixture layer on at least one surface of the three-dimensional porous film, thereby forming the precursor in which the solid electrolyte mixture layer is disposed on at least one surface of the three-dimensional porous film.

7. A method for producing an all-solid-state battery comprising a cathode comprising a cathode layer, an anode comprising an anode layer, and a solid electrolyte layer disposed between the cathode layer and the anode layer,
   wherein the solid electrolyte layer is a composite solid electrolyte layer obtained by the production method defined by claim 1.

8. A composite solid electrolyte layer for all-solid-state batteries,
   wherein the composite solid electrolyte layer comprises a solid electrolyte and a three-dimensional porous film containing a resin;
   wherein a pore diameter of the three-dimensional porous film is more than 2 μm; and
   wherein a softening temperature of the three-dimensional porous film is lower than a crystallization temperature of the solid electrolyte.

9. The composite solid electrolyte layer according to claim 8, wherein a porosity of the three-dimensional porous film is from 60% to 90%.

* * * * *